US006006003A

United States Patent [19]

Kim

[11] Patent Number: 6,006,003

[45] Date of Patent: Dec. 21, 1999

[54] APPARATUS FOR SEALING SUBSTRATES OF FIELD EMISSION DEVICE

[75] Inventor: Jong-min Kim, Yongin, Rep. of Korea

[73] Assignee: Samsung Display Devices Co., Ltd., Kyoungki, Rep. of Korea

[21] Appl. No.: 09/038,047

[22] Filed: Mar. 11, 1998

[51] Int. Cl.[6] .................................. G02B 6/00; H01J 9/26

[52] U.S. Cl. .............................................. 385/147; 445/25

[58] Field of Search .................................... 313/371, 372; 445/24, 25; 385/147, 901

[56] References Cited

U.S. PATENT DOCUMENTS 5,577,944 11/1996 Taylor ........................................ 445/25

5,772,485 6/1998 Jeng et al. ................................ 445/24

*Primary Examiner*—John D. Lee
*Assistant Examiner*—Juliana K. Kang
*Attorney, Agent, or Firm*—Kile, McIntyre, Harbin & Lee; Eugene M. Lee

[57] ABSTRACT

An apparatus for sealing the substrates of a field emission device and a method therefor are provided. The sealing apparatus according to the present invention includes an optical fiber arranged between two substrates near their edges, frit attached to the outer surface of the optical fiber for sealing a space between the two substrates with the optical fiber, a vacuum chamber, a thermal control gauge for controlling the temperature of the substrates during sealing, a plurality of substrate supporting holders having sharp pointed head portions for supporting the substrates on a minimal area, a plurality of heaters spaced from the two substrates by a predetermined distance, a gas injecting hole and a gas exhausting hole provided in one of the two substrates, and an Ar and $H_2$ gas injector contacting the gas injecting hole.

11 Claims, 6 Drawing Sheets

APPARATUS FOR SEALING SUBSTRATES OF FIELD EMISSION DEVICE

BACKGROUND OF THE INVENTION

1. Field of the Invention

The present invention relates to an apparatus for sealing two substrates of a field emission device and a method therefor.

2. Description of the Related Art

FIG. 1 is a sectional view of a conventional field emission device. As shown in FIG. 1, a plurality of cathodes 2 are formed on a rear surface substrate 1 in the conventional field emission device. A plurality of microtips 2' are formed on the cathodes 2 in an array pattern. The microtips 2' are formed in throughholes 3*a* of an insulating layer 3 formed on the cathodes 2. Gates 4 having an opening 4*a* corresponding to the throughhole 3*a* are stacked on the insulating layer 3. A front surface substrate 6 is provided on the gates 4, supported by spacers 8 spaced from each other by a predetermined distance. A plurality of anodes 5 are formed on the front surface substrate 6 so as to oppose the microtips 2'. Fluorescent films 7 are formed on the anodes 5. Each microtip array of the rear surface substrate (one of these is circled in the drawing) corresponds to a cathode of an electron gun of a CRT. The portion coated with a fluorescent film of the front surface substrate corresponds to an anode formed on the glass screen of a CRT.

When the microtip array of the field emission device is grounded and a uniform voltage is applied between the gates 4 and the anodes 5, electrons are emitted into a vacuum towards the anodes 5. The electrons are accelerated by the voltage of the anodes 5 and collide with a fluorescent film 7 with a predetermined kinetic energy. The kinetic energy of the electrons is transmitted to the fluorescent film 7. The fluorescent film 7 receives the kinetic energy of the electrons and is excited, emitting light.

In the field emission device having such a structure, the edges of the two substrates 1 and 6 are sealed to maintain a vacuum therebetween. FIG. 2 shows the two substrates before sealing. Here, optical fibers 9 are arranged near the edges of the rear surface substrate 1 in order to seal the two substrates. A getter tubulation hole 11 is formed near an edge of the rear surface substrate 1. As shown in FIG. 3, frit is sealed on the inner surface of the optical fiber 9 in a chamber (not shown).

However, in such an apparatus for sealing the substrates, the surfaces of the electrodes (cathodes and anodes) of the two substrates are not effectively outgassed, since pumping is performed through only the getter tubulation hole 11. The life of the field emission device is shortened since a surface processing is hard to perform. Also, since a thermal control (TC) gauge (not shown) is spaced from the surface of the anodes 5 without being attached thereto, a thermal control is not correct. Accordingly, a sealing condition is not good. The substrates are easily broken when tipping is performed, since a supporting holder for supporting the substrates is not provided.

SUMMARY OF THE INVENTION

To solve the above problem(s), it is an objective of the present invention to provide an apparatus for sealing a field emission device which provides excellent outgassing, correct sealing of a thermal control in substrates, and safe support for the substrates during a sealing process, and a method therefor.

Accordingly, to achieve the above objective, there is provided an apparatus for sealing substrates of a field emission device, comprising an optical fiber arranged between two substrates near their edges, frit attached to the outer surface of the optical fiber for sealing a space between the two substrates with the optical fiber, a vacuum chamber, a thermal control gauge for controlling the temperature of the substrates during sealing, a plurality of substrate supporting holders having sharp pointed head portions for supporting the substrates on a minimal area, a plurality of heaters spaced from the two substrates by a predetermined distance, a gas injecting hole and a gas exhausting hole provided in one of the two substrates, and an Ar and $H_2$ gas injector contacting the gas injecting hole.

In the present invention, the thermal control gauge contacts the substrate. The heaters are IR heaters. The plurality of IR heaters are spaced from the two substrates by 5–10 cm.

Also, to achieve the above objective, there is provided a method of sealing substrates of a field emission device in which an optical fiber is arranged between the edges of two substrates including a gas injecting hole and a gas exhausting hole in a vacuum chamber at a predetermined pressure and frit is put on the outer surface of the optical fiber, comprising the steps of (a) placing a thermal control gauge in contact with the surface of the substrate, (b) performing frit sealing by controlling the heating temperature of a heater using the thermal control gauge and flowing Ar and $H_2$ gases through the gas injecting hole, at the same time, (c) sealing the gas injecting hole, and (d) sealing a getter tubulation hole after evacuating the space between the substrate by connecting the gas exhausting hole to a high vacuum pump and controlling the heating temperature of the heater at the same time.

In the present invention, the pressure in the vacuum chamber is between 100–1.000 mTorr. The thermal control in step (b) is performed by heating the substrates for 30 minutes with the temperature rising at an average rate of 13° C./minute, maintaining the substrates at 450° C. for 15 minutes, and cooling the substrates for 30 minutes with the temperature falling at an average rate of 13° C./minute. The thermal control in step (d) is performed by heating the substrates for 60 minutes with the temperature rising at an average rate of 5° C./minute, maintaining the substrates at 330° C. for 90–120 minutes, and cooling the substrates for 90–60 minutes with the temperature falling at an average rate of 5° C./minute.

BRIEF DESCRIPTION OF THE DRAWING(S)

The above objective and advantages of the present invention will become more apparent by describing in detail a preferred embodiment thereof with reference to the attached drawings in which.

Figure 7A:
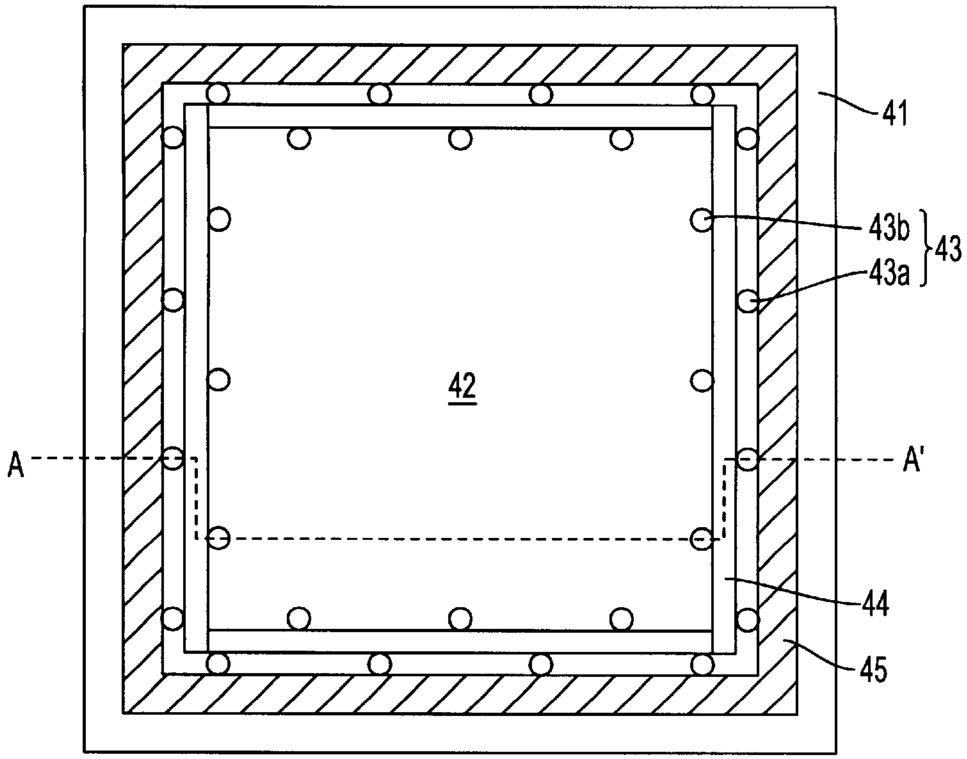
Figure 7B:
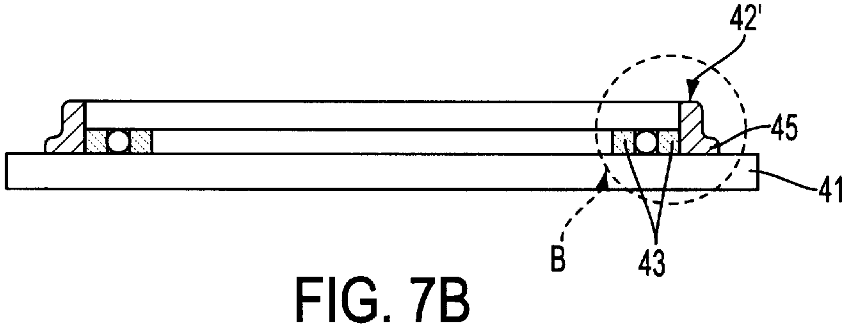
Figure 7C:
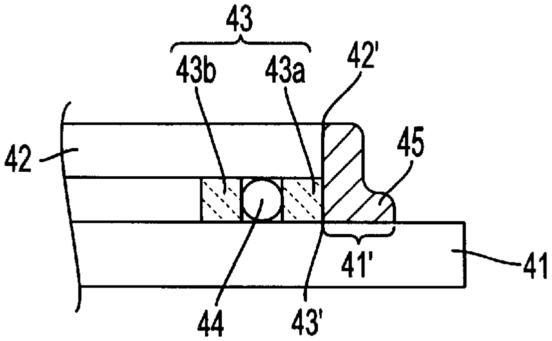
Figure 8:
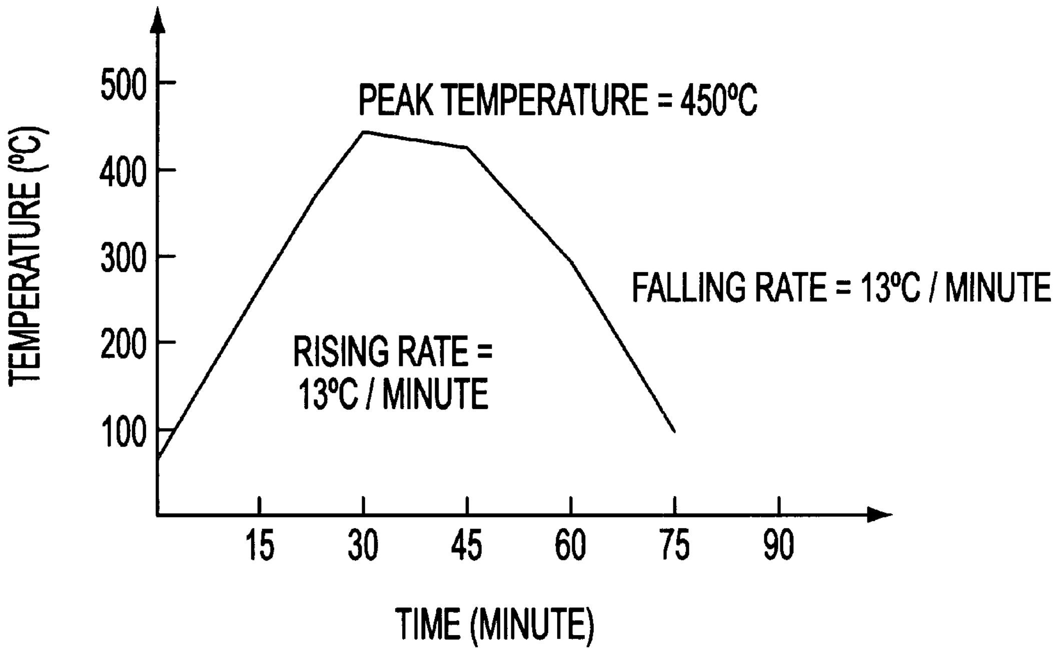
Figure 9:
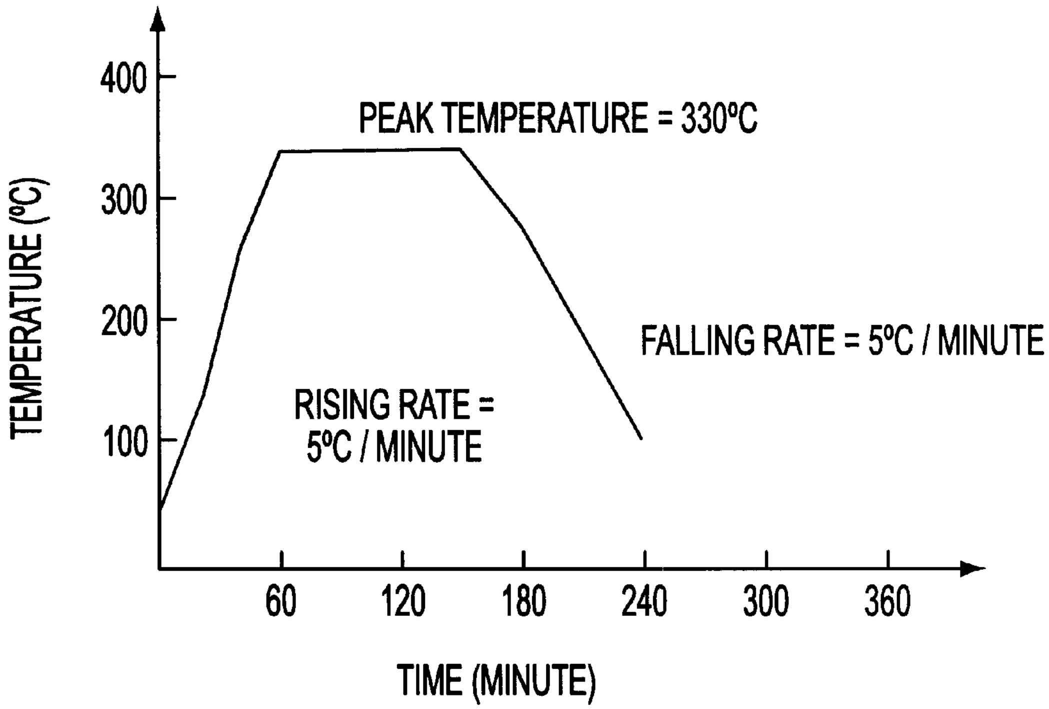

FIGS. 7*a* through 7*c* are respectively a plan view, a sectional view, and an enlarged sectional view of another two substrates sealed by the substrate sealing apparatus according to the present invention;

FIG. 8 is a heating temperature profile when a first frit sealing is performed on the front surface substrate and the rear surface substrate of the field emission device, according to the present invention; and FIG. 9 is a heating temperature profile when a second evacuation is performed on the front surface substrate and the rear surface substrate of the field emission device, according to the present invention.

DESCRIPTION OF THE PREFERRED EMBODIMENT(S)

Hereinafter, an apparatus for sealing substrates of a field emission device according to the present invention and a method therefor will be described with reference to the attached drawings.

Figure 1A:
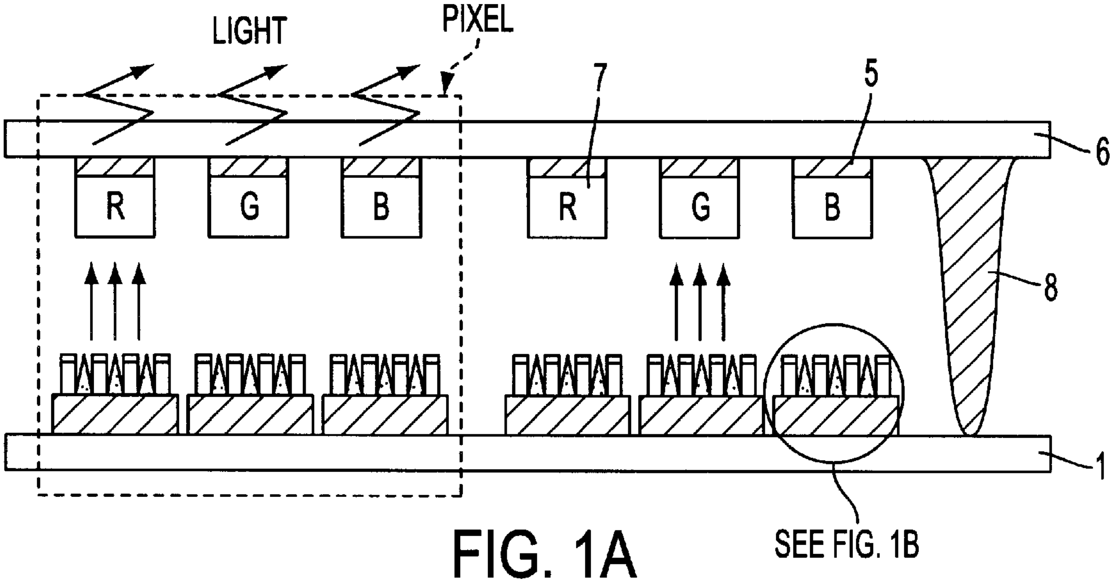
FIG. 1 is a sectional view of a general field emission device.
Figure 1B:
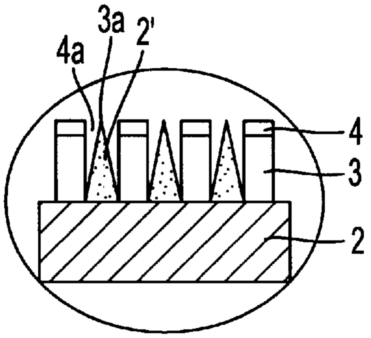
Figure 2:
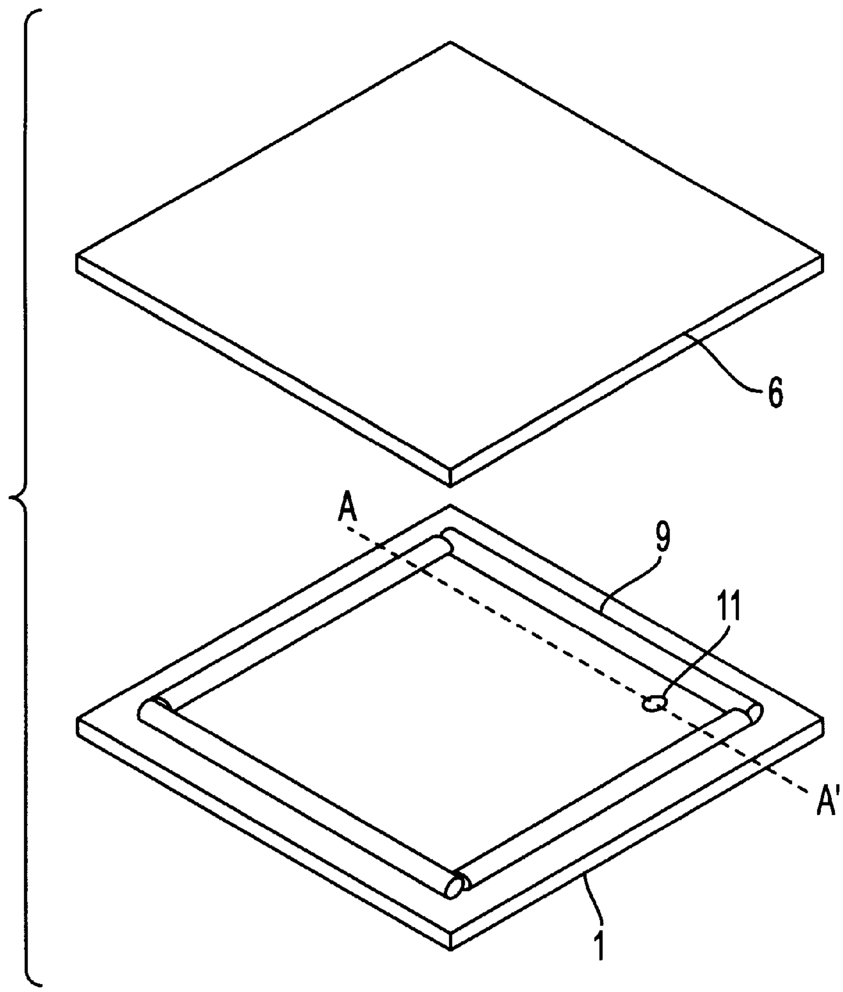
FIG. 2 is an exploded perspective view of the two substrates sealed by a conventional sealing apparatus.
Figure 3:
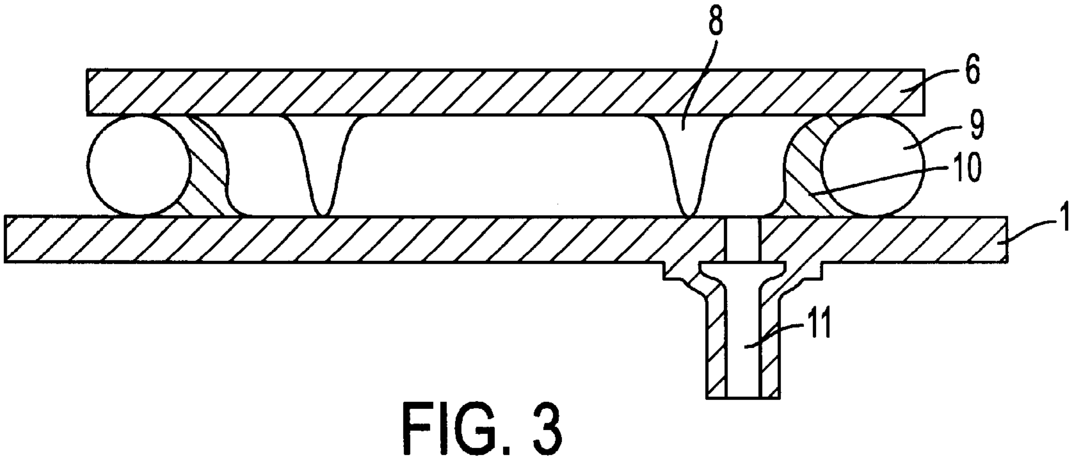
FIG. 3 is a sectional view taken along the line A–A' of FIG. 2.
Figure 4:
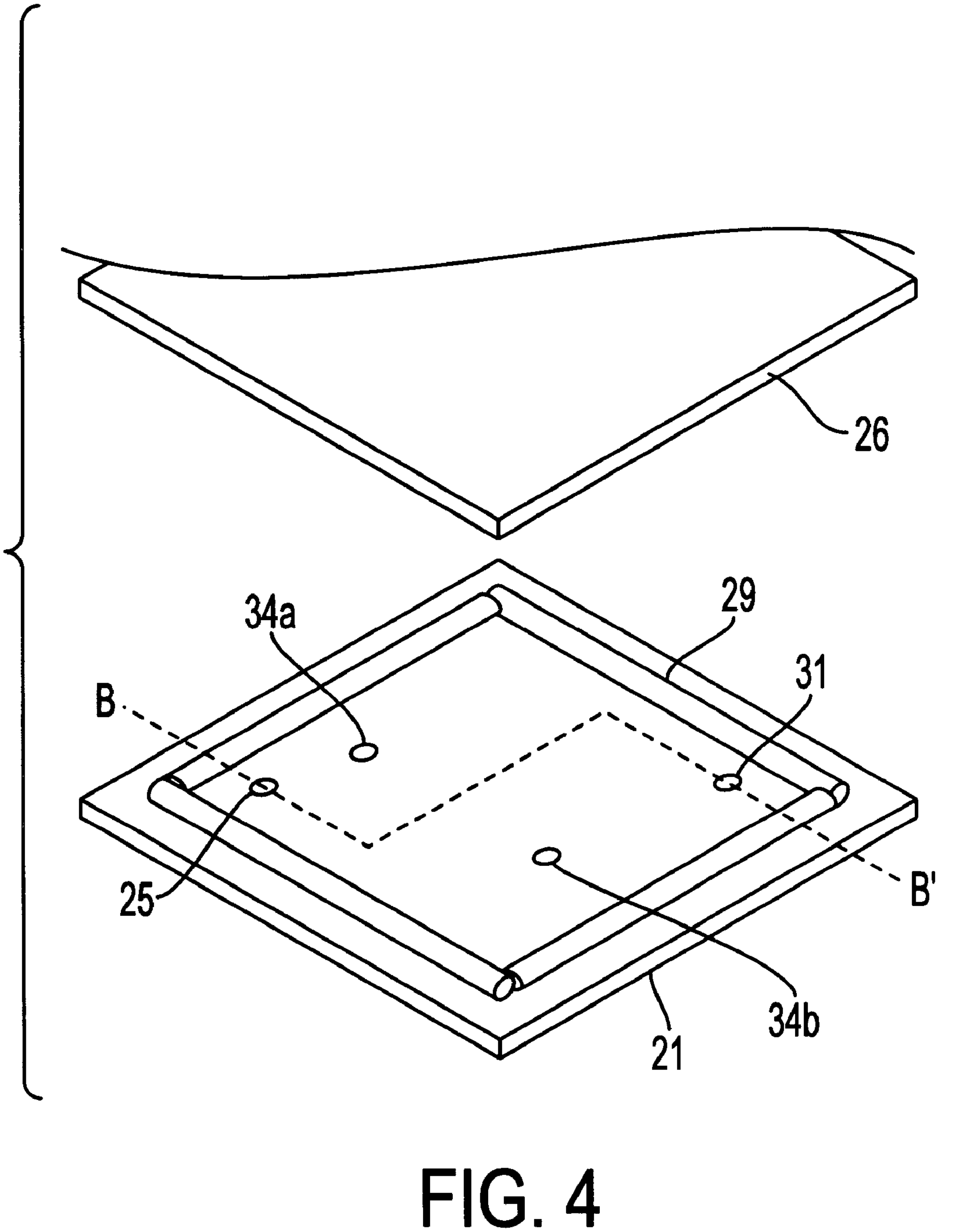
FIG. 4 is an exploded perspective view of two substrates sealed by an apparatus for sealing substrates according to the present invention.
Figure 5:
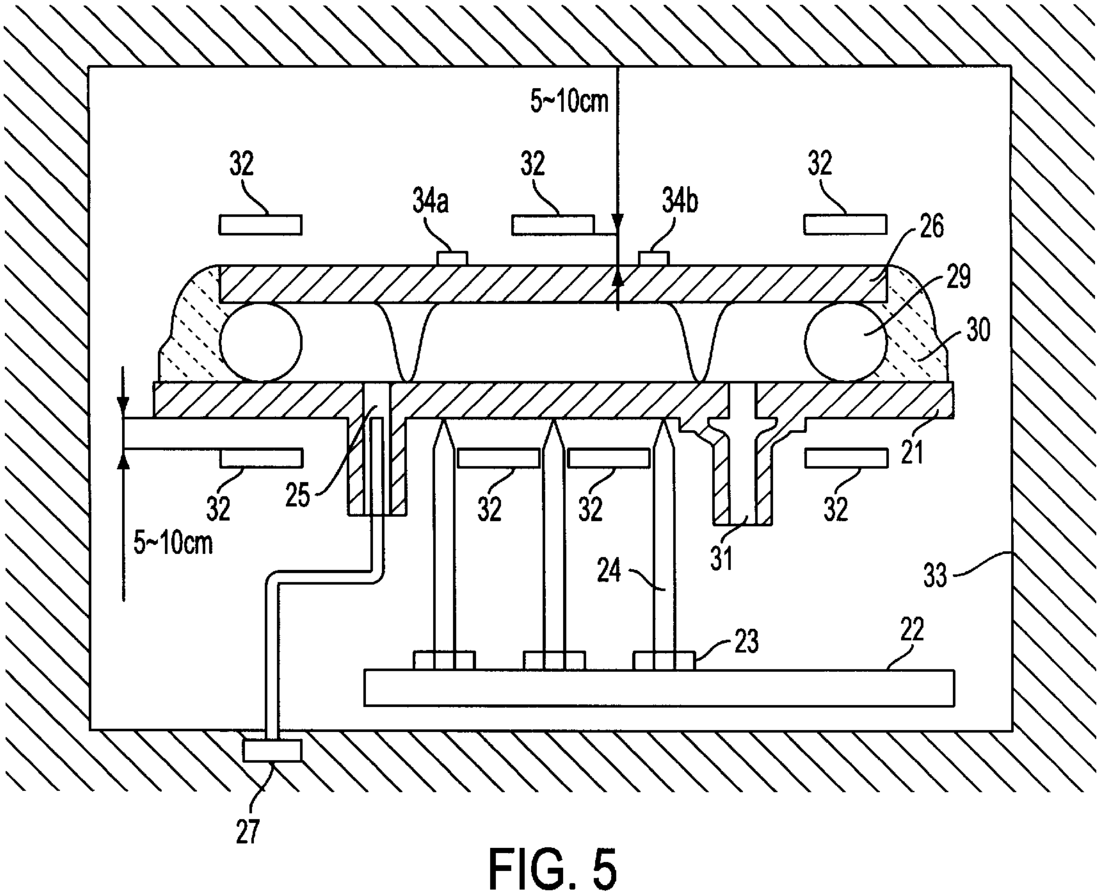
FIG. 5 is a sectional view of the substrate sealing apparatus of a field emission device, according to the present invention (the two substrates are sectioned along the line B–B' of FIG. 4)

FIG. 4 is an exploded perspective view of two substrates sealed by the sealing apparatus according to the present invention. As shown in FIG. 4, in a method for sealing substrates according to the present invention, an injection hole 25 for injecting Ar or Hydrogen gas is further provided on a rear surface substrate 21 as well as a getter tubulation hole 31. The use of the injection hole 25 will be described in detail with reference to the substrate sealing apparatus of the field emission device according to the present invention, as shown in FIG. 5. The two substrates in FIG. 5 are sectioned along the line B–B' of FIG. 4.

As shown in FIG. 5, in the substrate sealing apparatus of the field emission device, according to the present invention, optical fibers 29 are arranged near the edges of the two substrates 21 and 26 spaced from each other by a predetermined distance by spacers 28. Frit 30 is sealed on the outer surface of the optical fibers 29. The substrates 21 and 26 are put on a substrate supporting holder 24 in a chamber 33, and a gas injecting tube from a fluorescent material stabilizing $H_2$/Ar gas injector 27 and the exhaust tube of a pump (not shown) are respectively connected to an injection hole 25 and the getter tubulation hole 31 provided in the rear surface substrate 21. An IR heater 32 is arranged near the substrates 21 and 26. Also, thermal control gauges 34*a* and 34*b* are arranged on the surface of the glass substrate 26 so that a correct thermal control can be performed. By doing so, the temperature is correctly controlled performed during sealing.

Figure 6:
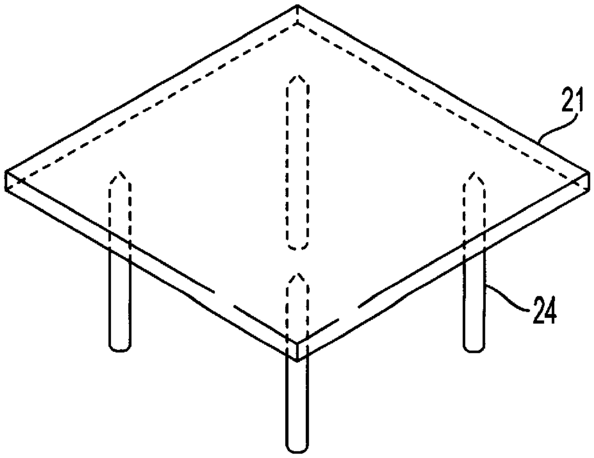
FIG. 6 shows the arrangement of substrate holders of the sealing apparatus of the field emission device of FIG. 5.

In the above structure, the two holes 25 and 31 are for controlling the $H_2$/Ar gas injected during the sealing to flow under minimal pressure. Namely, during the sealing, the holes 25 and 31 effectively remove the gases of the fluorescent material and the cathodes by controlling the flow of the Ar gas and control the flow of the $H_2$ to hydrogenate the surface of the microtip formed on the cathode, thus cleaning the surface of the microtip and reducing a work function. The IR heater 32, which have an output power of about 1 KW for removing the gas of the surfaces of the fluorescent material and the electrode and for processing the surface, are respectively arranged below the substrate 21 and above the substrate 26, spaced from the substrates by 5–10 cm. Also, as shown in FIG. 6, the pointed heads of the substrate supporting holders 24 are as sharp as possible so as to minimize a contact area with the glass substrate 21, thus minimizing a shock by heat applied to the glass substrate 21 during cooling or heating. The height of the substrate supporting holder 24 is controlled by a screw 23 provided on a holder fixing plate 22.

FIGS. 7*a* through 7*c* show another structure in which the substrates are sealed by the substrate sealing apparatus of the field emission device according to the present invention. FIG. 7*a* is a plan view of the substrates. FIG. 7*b* is a sectional view taken along the line A–A' of FIG. 7*a*. FIG. 7*c* is an enlarged view of portion B of FIG. 7*b*. In FIGS. 7*a* through 7*c*, a plurality of spacers 43 spaced from each other by a predetermined distance are formed between the edge of a rear surface substrate 41 having cathodes, microtips, an insulating layer, and gates and the edge of a front surface substrate 42 having anodes in two rows. Glass optical fiber 44 having a diameter of not more than 200 $\mu$m is inserted between the two rows of spacers 43. A space between by the two substrate is sealed by putting frit on the outer surface of the optical fiber 44. In particular, the rear surface substrate 41 is wider than the front surface substrate 42. The outer portion of the spacer 43*a* of the outer row among the two rows of spacers coincides with the edge of the front surface substrate 42. Accordingly, as shown in FIG. 7*b*, frit 45 is put on the rear surface substrate 41 to a predetermined width so as to cover the outer portion of the spacer 43*a* of the outer row and the edge 42' of the front surface substrate 42. Here, the optical fiber 44 contacts minimal areas of the cathodes of the rear surface substrate 41 and the anodes of the front surface substrate 42. Also, the distance between the two rows of spacers 43 is the same as the diameter of the optical fiber 44. In particular, in the two rows of spacers 43, the spacers 43*b* of the inner row alternate with the spacers 43*a* of the outer row, as shown in FIG. 7*a*.

The method for sealing the field emission device using the sealing apparatus having the above structure is as follows.

First, frit sealing is performed, while correctly controlling a heating temperature by contacting the thermal control gauge with the surface of the glass substrate and flowing the Ar gas and the $H_2$ gas at minimal pressure through the gas injecting hole. At this time, the frit sealing environment is optimized by maintaining the pressure in the chamber 33 at 100–1,000 mTorr. The gases of the fluorescent film and the cathode are effectively removed by controlling the flow of the Ar gas. The surface of the microtip is cleaned and the work function is lowered by hydrogenating the surface of the microtip. As shown in FIG. 8, during the frit sealing, a first thermal control is performed by heating the substrates for 30 minutes with the temperature rising at an average rate of 13° C./minute, maintaining the substrates at 450° C. for 15 minutes, and cooling the substrates for 30 minutes with the temperature falling at an average rate of 13° C./minute.

Then, the gas injection hole 25 is sealed. Evacuation is performed by connecting the tubulation hole 31 to a high vacuum pump such as an ion pump. As shown in FIG. 9, a second thermal control is performed by heating the substrates for 60 minutes with the temperature rising at an average rate of 5° C./minute, maintaining the substrates at 330° C., and cooling the substrates for 90–60 minutes with the temperature falling at an average rate of 5° C./minute. The getter tubulation hole 31 of the field emission device is then sealed to maintain the vacuum.

As mentioned above, the apparatus for sealing the field emission device according to the present invention and the method therefor have the following advantages.

First, the temperature of the sealing can be precisely controlled since the thermal control (TC) gauge contacts the surface of a substrate.

Second, the gases of the fluorescent material and the cathode are effectively removed by including two holes on the rear surface substrate, flowing the Ar gas through the device during the sealing, and processing the surfaces of the device.

Third, the surfaces of the microtips are hydrogenated by flowing $H_2$ through the two holes. Accordingly, the surfaces of the microtips are cleaned and the work function is lowered. Therefore, the life of the field emission device is prolonged.

Fourth, the pointed heads of the substrate supporting holders are sharpened, thus minimizing the contact area with the glass substrate. Accordingly, a shock generated by the heat applied to the glass substrate during the cooling or the heating is minimized.

Fifth, the maximum amount of gas is removed, by performing sealing under a vacuum.

What is claimed is:

1. An apparatus for sealing substrates of a field emission device, comprising:

an optical fiber arranged between two substrates near their edges;

frit attached to the outer surface of the optical fiber for sealing a space between the two substrates with the optical fiber;

a vacuum chamber;

a thermal control gauge for controlling the temperature of the substrates during sealing;

a plurality of substrate supporting holders having sharp pointed head portions for supporting the substrates on a minimal area;

a plurality of heaters spaced from the two substrates by a predetermined distance;

a gas injecting hole and a gas exhausting hole provided in one of the two substrates; and an Ar and $H_2$ gas injector contacting the gas injecting hole.

2. The apparatus of claim 1, further comprising a plurality of spacers formed near the edges of the two substrates, in two rows with the optical fiber between, wherein a rear surface substrate is wider than the a front surface substrate among the two substrates, the outer portions of the spacers of the outer row coincide with the edge of the front surface substrate, and the frit is put on the rear surface substrate to a predetermined width so as to cover the outer portions of the spacers of the outer row and the edge of the front surface substrate.

3. The apparatus of claim 2, wherein the optical fiber has a diameter of not more than 200 $\mu$m.

4. The apparatus of claim 2, wherein the spacers of the inner row are arranged alternately with the spacers of the outer row.

5. The apparatus of claim 1, wherein the thermal control gauge contacts the substrate.

6. The apparatus of claim 1, wherein the heaters are IR heaters.

7. The apparatus of claim 6, wherein the plurality of IR heaters are spaced from the two substrates by 5–10 cm.

8. A method of sealing substrates of a field emission device in which an optical fiber is arranged between the edges of two substrates including a gas injecting hole and a gas exhausting hole in a vacuum chamber at a predetermined pressure and frit is put on the outer surface of the optical fiber, comprising the steps of:

(a) placing a thermal control gauge in contact with the surface of the substrate;

(b) performing frit sealing by controlling the heating temperature of a heater using the thermal control gauge and flowing Ar and $H_2$ gases through the gas injecting hole, at the same time;

(c) sealing the gas injecting hole; and (d) sealing a getter tubulation hole after evacuating the space between the substrates by connecting the gas exhausting hole to a high vacuum pump and controlling the heating temperature of the heater at the same time.

9. The method of claim 8, wherein the pressure in the vacuum chamber is between 100–1,000 mTorr.

10. The method of claim 8, wherein the thermal control in step (b) is performed by heating the substrates for 30 minutes with the temperature rising at an average rate of 13° C./minute, maintaining the substrates at 450° C. for 15 minutes, and cooling the substrates for 30 minutes with the temperature falling at an average rate of 13° C./minute.

11. The method of claim 8, wherein the thermal control in step (d) is performed by heating the substrates for 60 minutes with the temperature rising at an average rate of 5° C./minute, maintaining the substrates at 330° C. for 90–120 minutes, and cooling the substrates for 90–60 minutes with the temperature falling at an average rate of 5° C./minute.

* * * * *